US012448182B2

(12) United States Patent
Turner et al.

(10) Patent No.: US 12,448,182 B2
(45) Date of Patent: Oct. 21, 2025

(54) PACKAGING FOR LIQUIDS TO BE DISPENSED

(71) Applicant: ORALABS, Inc., Parker, CO (US)

(72) Inventors: Chris P. Turner, Parker, CO (US); Gary Schlatter, Parker, CO (US)

( * ) Notice: Subject to any disclaimer, the term of this patent is extended or adjusted under 35 U.S.C. 154(b) by 227 days.

(21) Appl. No.: 18/446,346

(22) Filed: Aug. 8, 2023

(65) Prior Publication Data

US 2025/0051065 A1    Feb. 13, 2025

(51) Int. Cl.
*B65D 47/12* (2006.01)
*B65D 23/12* (2006.01)
*B65D 55/00* (2006.01)

(52) U.S. Cl.
CPC ........... *B65D 47/122* (2013.01); *B65D 23/12* (2013.01); *B65D 55/00* (2013.01)

(58) Field of Classification Search
CPC ...... B65D 41/62; B65D 47/122; B65D 23/12; B65D 55/00; B65D 2203/02; B65D 41/56; B65D 50/041; B65D 1/0223
See application file for complete search history.

(56) References Cited

U.S. PATENT DOCUMENTS

| | | | | |
|---|---|---|---|---|
| 4,834,251 A | * | 5/1989 | Yu | B65D 41/26 |
| | | | | 215/DIG. 7 |
| 5,123,555 A | * | 6/1992 | Luch | B67D 3/0032 |
| | | | | 215/256 |
| 5,413,233 A | * | 5/1995 | Hall | B65D 50/046 |
| | | | | 215/221 |
| 6,206,251 B1 | * | 3/2001 | Williams | B65D 47/2018 |
| | | | | 222/481.5 |
| 9,975,673 B2 | * | 5/2018 | Prater | B65D 85/70 |
| 2004/0007555 A1 | * | 1/2004 | Steele, IV | B65D 23/102 |
| | | | | 215/DIG. 7 |
| 2012/0006860 A1 | * | 1/2012 | Suffa | B65D 47/2081 |
| | | | | 222/491 |

(Continued)

Primary Examiner — Kareen K Thomas
(74) Attorney, Agent, or Firm — WELSH FLAXMAN & GITLER LLC

(57) ABSTRACT

A packaging for a liquid to be dispensed includes a bottle having a mouth, a finish, a neck, a multi-faceted shoulder, a multi-faceted bottle body having a multi-faceted cross-sectional configuration, and a base. The packaging also includes a safety cap which cooperates with the finish and is free to rotate when secured to the finish sealing the mouth of the bottle and the safety cap having a continuous side wall. The packaging further includes a reusable dosage cup having a closed end and side walls that extend up to an open end, the side walls having an interior surface with a plurality of spaced fins extending inwardly to contact the continuous side wall of the safety cap and form a friction fit therewith such that the reusable dosage cup can be removably secured to the safety cap, wherein the open end of the reusable dosage cup has a circumferential configuration dimensioned to be the same as the cross-sectional dimensions and configuration of the multi-faceted bottle body and when the reusable dosage cup is placed over the safety cap and pressed down to secure the reusable dosage cup to the bottle, the reusable dosage cup and the safety cap will rotate to a position such that the side walls of the reusable dosage cup will align with and match the cross-sectional configuration of the multi-faceted bottle body.

10 Claims, 11 Drawing Sheets

(56) References Cited

U.S. PATENT DOCUMENTS

| | | | | |
|---|---|---|---|---|
| 2013/0193143 A1* | 8/2013 | Vogel | ................... | B65D 41/56 |
| | | | | 220/212 |
| 2013/0193170 A1* | 8/2013 | Lehmkuhl | .......... | B65D 51/1644 |
| | | | | 222/494 |
| 2013/0341329 A1* | 12/2013 | Adler | ..................... | G09F 3/10 |
| | | | | 283/81 |
| 2021/0212899 A1* | 7/2021 | Van Skaik | ............ | A61J 7/0046 |

* cited by examiner

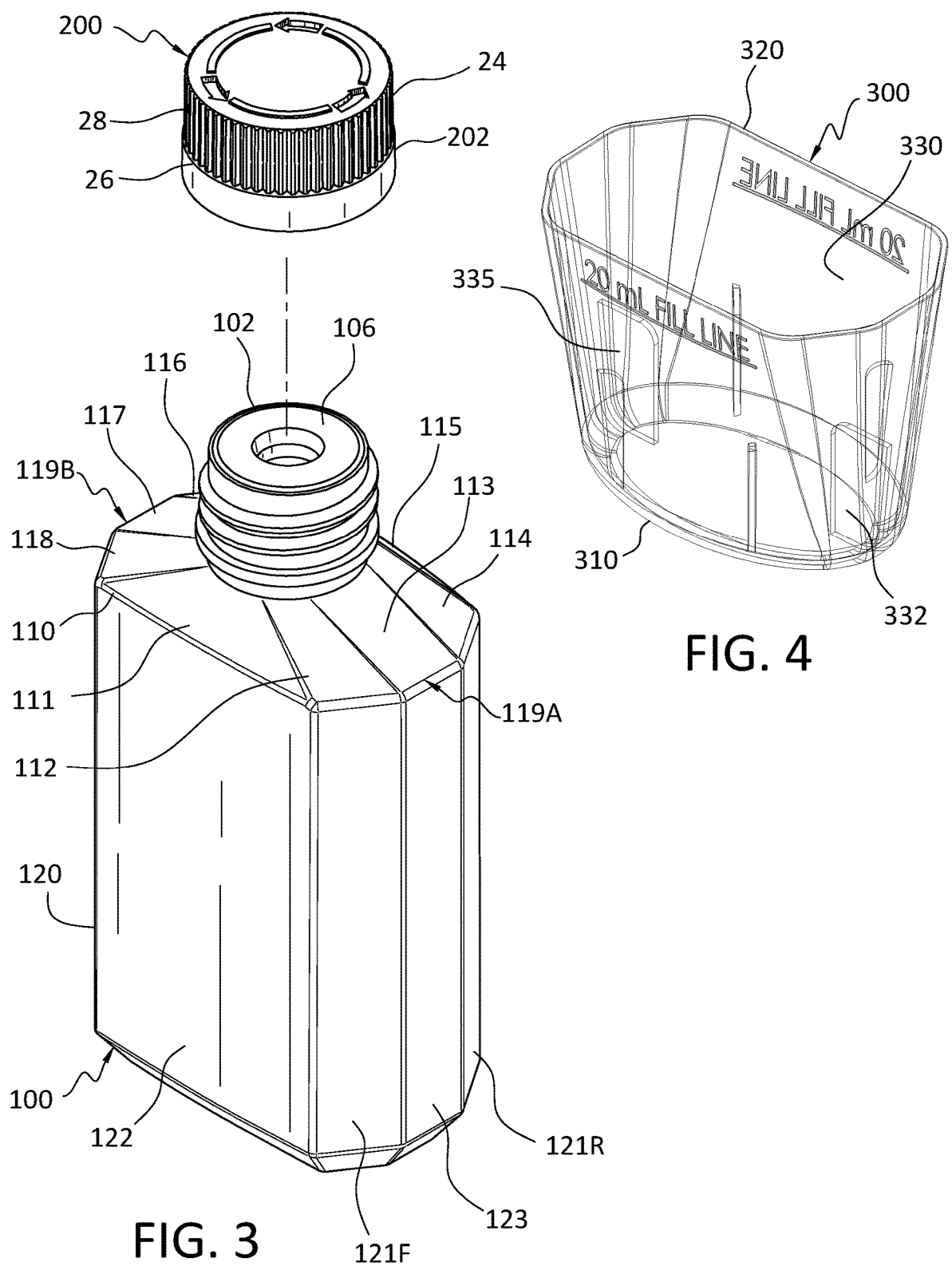

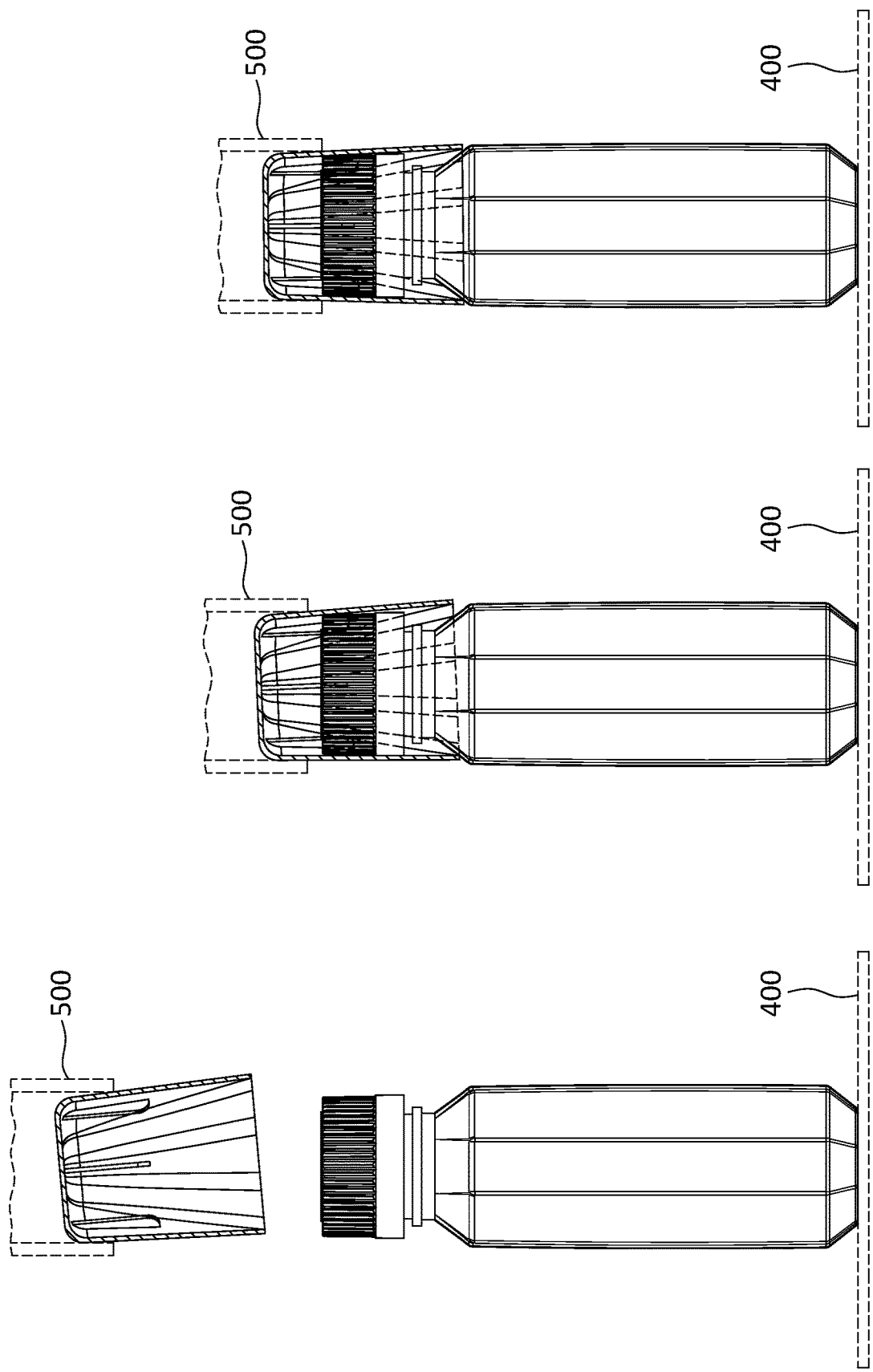

PACKAGING FOR LIQUIDS TO BE DISPENSED

BACKGROUND OF THE INVENTION

Field of the Invention

This invention relates to packaging for liquids to be dispensed. The packaging includes a bottle, a safety cap, and a reusable dosage cup which continues the configuration of the bottle. The bottle holds liquid to be dispensed into the reusable dosage cup when the reusable dosage cup is removed from the bottle. Preferably, the liquid is an oral rinse personal care composition in the form of a mouthwash concentrate.

SUMMARY OF THE INVENTION

The present invention is directed to packaging for holding a liquid to be dispensed. The packaging includes a bottle, a safety cap for closing the mouth of the bottle and preventing removal by children, and a reusable dosage cup for holding the liquid when dispensed from the bottle and mixed with water in the reusable dosage cup.

Additionally, a concentrated mouthwash is the liquid contained in the bottle and the bottle is a squeeze dispensing squeeze bottle with a dispensing valve. The bottle is packaged with the reusable dosage cup which fits over the neck and shoulder of the bottle to cover the safety cap while attaching to the safety cap. The reusable dosage cup is shaped such that it conforms to and continues the bottle configuration. The reusable dosage cup further includes a fill line indicator to indicate the proper fill level for water to be mixed with the liquid dispensed from the bottle.

It is an object of the present invention to provide packaging for a liquid to be dispensed includes a bottle having a mouth, a finish, a neck, a multi-faceted shoulder, a multi-faceted bottle body having a multi-faceted cross-sectional configuration, and a base. The packaging also includes a safety cap which cooperates with the finish and is free to rotate when secured to the finish sealing the mouth of the bottle and the safety cap having a continuous side wall. The packaging further includes a reusable dosage cup having a closed end and side walls that extend up to an open end, the side walls having an interior surface with a plurality of spaced fins extending inwardly to contact the continuous side wall of the safety cap and form a friction fit therewith such that the reusable dosage cup can be removably secured to the safety cap, wherein the open end of the reusable dosage cup has a circumferential configuration dimensioned to be the same as the cross-sectional dimensions and configuration of the multi-faceted bottle body and when the reusable dosage cup is placed over the safety cap and pressed down to secure the reusable dosage cup to the bottle, the reusable dosage cup and the safety cap will rotate to a position such that the side walls of the reusable dosage cup will align with and match the cross-sectional configuration of the multi-faceted bottle body.

It is another object of the present invention to provide packaging for a liquid to be dispensed which further includes a product label that wraps the multi-faceted bottle body and the reusable dosage cup together.

It is still another object of the present invention to provide packaging for a liquid to be dispensed which further includes a dispensing valve in the mouth of the bottle.

It is yet another object of the present invention to provide packaging for a liquid to be dispensed wherein the bottle contains a liquid is and the liquid is a mouthwash concentrate that is dispensed into the reusable dosage cup once filled to the fill line with water.

It is another object of the present invention to provide packaging for a liquid to be dispensed wherein the plurality of fins have a rounded edge.

It is another object of the present invention to provide packaging for a liquid to be dispensed wherein the multi-faceted shoulder includes a front and a rear shoulders that angle up to the neck at the same angle and a first and a second side shoulders that angle up to the neck at the same angle and the angle of the front and rear shoulders is greater than the angle of the first and second side shoulders.

It is another object of the present invention to provide packaging for a liquid to be dispensed wherein the continuous side wall of the safety cap includes a series of grooves and the fins of the reusable dosage cup fit into the grooves when the reusable cup is secured to the safety cap.

It is another object of the present invention to provide packaging for a liquid to be dispensed wherein the safety cap can rotate both in a clockwise and a counterclockwise direction while secured to the finish in a position sealing the mouth and preventing removal without sufficient downward pressure.

It is still another object of the invention to provide packaging for a liquid to be dispensed, wherein the multi-faceted bottle body when traveling around the circumference of the multi-faceted bottle body includes a first side wall and an opposed second side wall between which a spaced front wall and a rear wall with matching lengths W extend, wherein the first side wall includes a first front facet portion of a length L, a first central facet portion of a length L1, and a first rear facet portion of a length L, and the second side wall includes a second front facet portion of a length L, a second central facet portion of a length L1, and a second rear facet portion of a length L.

It is another object of the invention to provide packaging for a liquid to be dispensed, wherein the reusable dosage cup when traveling around the circumference the open end of the reusable dosage cup includes multi-faceted side walls integral with closed end, the side walls include a front wall that is dimensioned at the open end of the reusable dosage cup to correspond with and match the length W of the front wall of the multi-faceted bottle body, a rear wall that is dimensioned at the open end of the reusable dosage cup to correspond with and match the length W of the rear wall of the multi-faceted bottle body, a first side wall having front facet portion that is dimensioned at the open end of the reusable dosage cup to correspond with and match the length L of the front facet portion of the first side wall of multi-faceted bottle body, a central facet portion that is dimensioned at the open end of the reusable dosage cup to correspond with and match the length L1 of the central facet portion of the first side wall of multi-faceted bottle body, a rear facet portion that is dimensioned at the open end of the reusable dosage cup to correspond with and match the length L of the rear facet portion of first side wall of multi-faceted bottle body, a second side wall having front facet portion that is dimensioned at the open end of the reusable dosage cup to correspond with and match the length L of the front facet portion of the second side wall of the multi-faceted bottle body, a central facet portion that is dimensioned at the open end of the reusable dosage cup to correspond with and match the length L1 of the central facet portion of the second side wall of the multi-faceted bottle body, and a rear facet portion that is dimensioned at the open end of the reusable dosage cup to correspond with and match the length L of the rear facet portion of the second side wall of the multi-faceted bottle body.

BRIEF DESCRIPTION OF DRAWINGS

FIG. 3 shows the dispensing bottle of the present invention with the cap removed.

FIG. 4 shows a perspective view of the reusable dosage cup removed from the dispensing bottle with its open end up.

FIGS. 10A-10C are side elevation views showing the progression of the reusable dosage cup being secured to the safety cap and aligned with the multi-faceted bottle body.

DESCRIPTION OF THE PREFERRED EMBODIMENT

The detailed embodiment of the present invention is disclosed herein. It should be understood, however, that the disclosed embodiment is merely exemplary of the invention, which may be embodied in various forms. Therefore, the details disclosed herein are not to be interpreted as limiting, but merely as a basis for teaching one skilled in the art how to make or use the invention.

Figure 5:
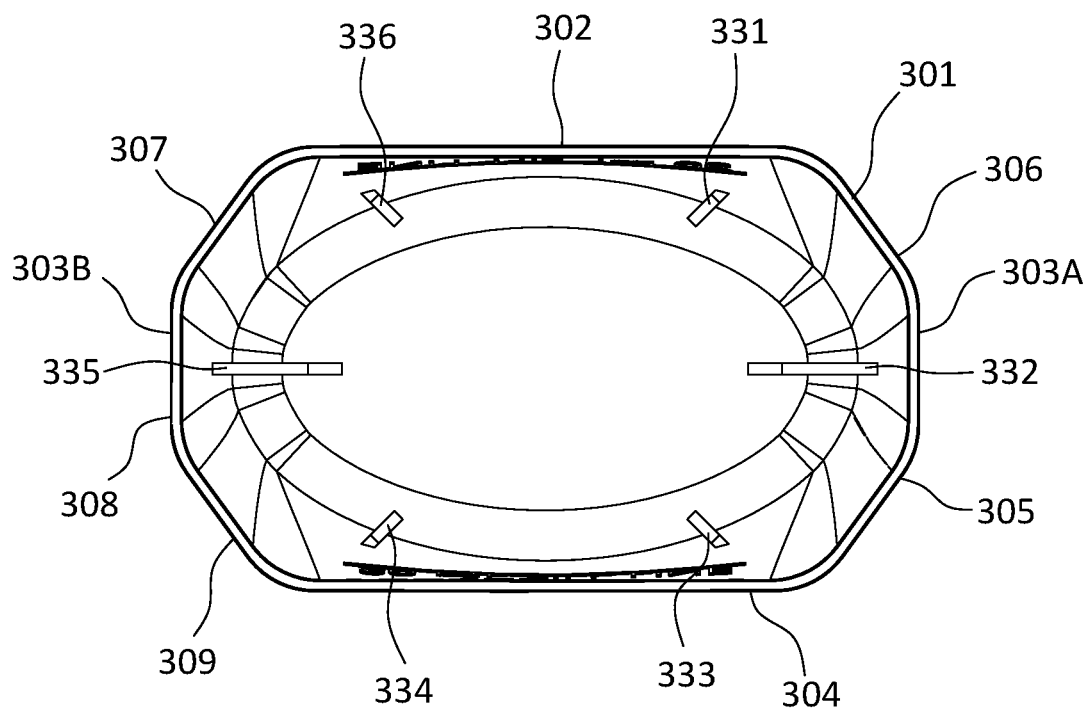
FIG. 5 shows a top view of the reusable dosage cup displaying the location of the six spaced fins for attachment to the safety cap.
Figure 6:
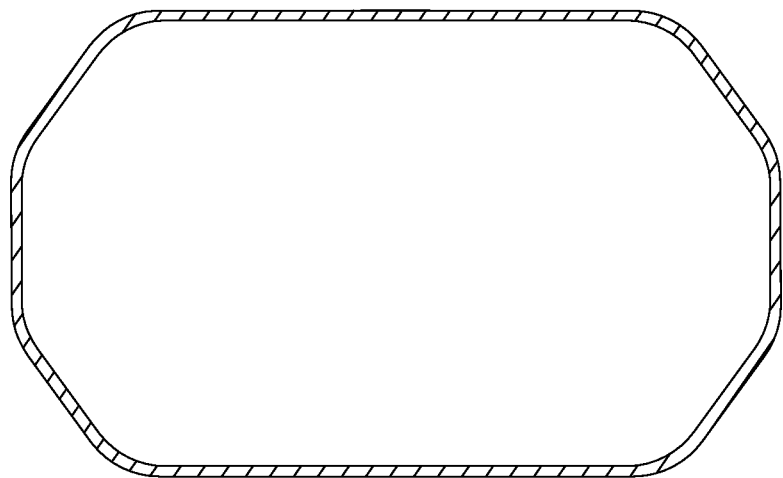
FIG. 6 is a cross-sectional view taken along the line 6-6 shown in FIG. 1.
Figure 7:
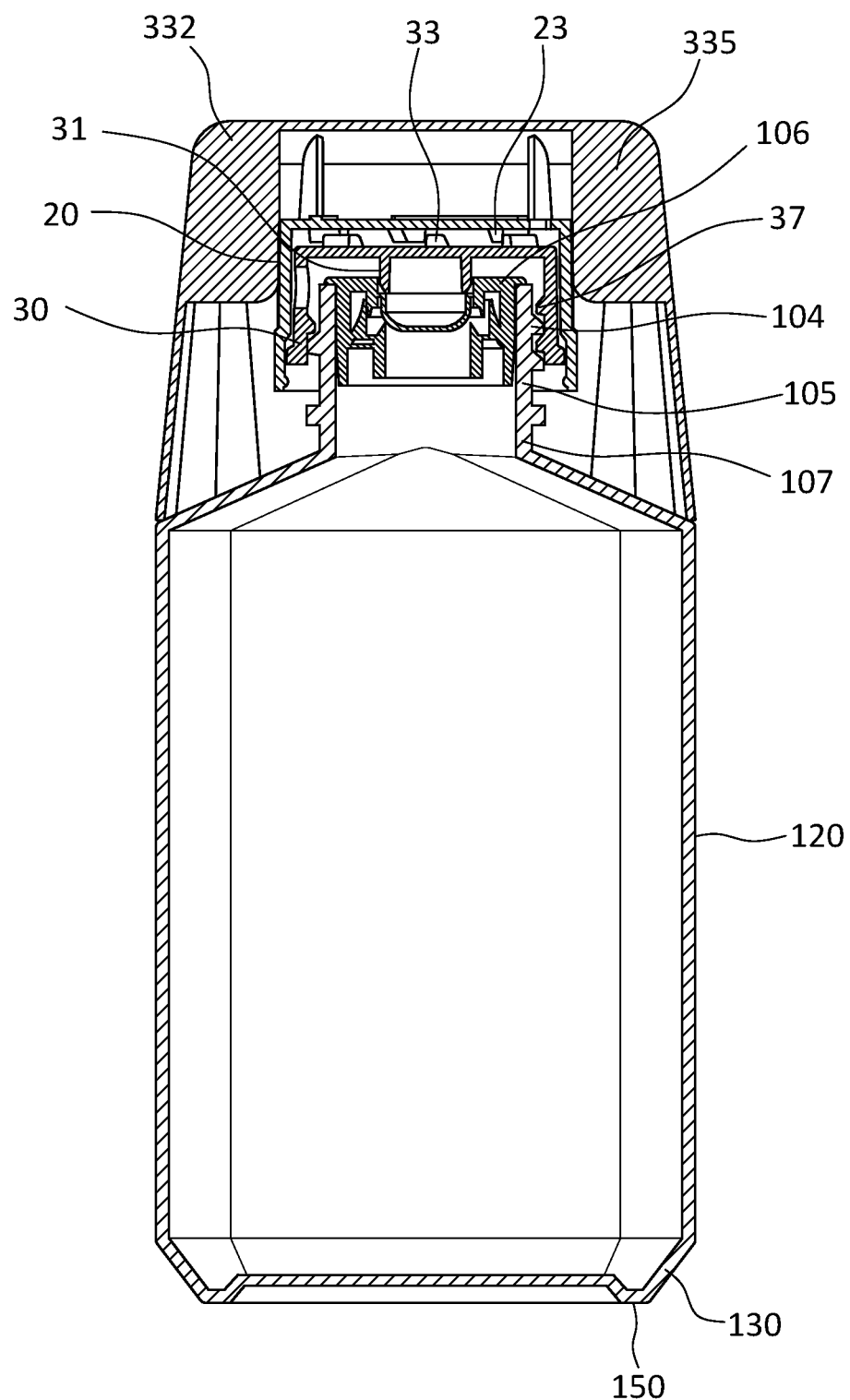
FIG. 7 is a cross-sectional view taken along the line 7-7 shown in FIG. 1.

Briefly, the packaging for a liquid contained therein to be dispensed includes a bottle 100 having a mouth 102, a finish 105, a neck 107, a multi-faceted shoulder 110, a multi-faceted bottle body 120 having a multi-faceted cross-sectional configuration (as seen in FIG. 6), and a base 130. A safety cap 200, which cooperates with the finish 105 and is free to rotate when secured to the finish 105, seals the mouth 102 of the bottle 100. The safety cap 200 has a continuous circular side wall 202. A reusable dosage cup 300 is also provided. The reusable dosage cup 300 includes a closed end 310 and integral continuous side walls that extend up to an open end 320, the side walls have an interior surface 330 with a plurality of spaced fins 331, 332, 333, 334, 335, 336 extending inwardly to contact the continuous circular side wall 202 of the safety cap 200 and form a friction fit therewith such that the reusable dosage cup 300 can be removably secured to the safety cap 200. The open end 320 of the reusable dosage cup 300 has a circumferential configuration which is dimensioned to match the cross-sectional configuration of the multi-faceted bottle body 120, as can be easily seen when FIGS. 5 and 6 are viewed together, and when the reusable dosage cup 300 is placed over the safety cap 200 and pressed down to secure the reusable dosage cup 300 to the bottle 100, the reusable dosage cup 300 and safety cap 200 rotate to a position such that the side walls of the reusable dosage cup 300 align with and match the cross-sectional configuration of the multi-faceted bottle body 120 to complete cover the multi-faceted shoulder 110.

Referring to FIGS. 1-8 the packaging 50 is described in more detail. In accordance with the present invention, packaging 50 for holding liquid to be dispensed into a reusable dosage cup 300 is shown. The packaging 50 includes a bottle 100, a safety cap 200 for closing the mouth 102 of the bottle 100 and preventing removal by children, and a reusable dosage cup 300 for holding the liquid when dispensed.

The bottle 100, from top to bottom, includes a mouth 102 into which a dispensing valve 106 is inserted, a threaded finish 105 shaped to accommodate the safety cap 200, a neck 107, a multi-faceted shoulder 110, a multi-faceted bottle body 120 with a center, and a base 130.

As used herein when describing the bottle, the term "inward" refers to a direction toward the center of the bottle. The term "outward" refers to a direction away from the center of the bottle. The term "top" means at the mouth of the bottle and "bottom" means at the base of the bottle. The term "side" is used only with reference to the figures as drawn. The term "upward" refers to a direction from the base toward the mouth of the bottle and "downward" refers to a direction from the mouth toward the base.

Figure 1:
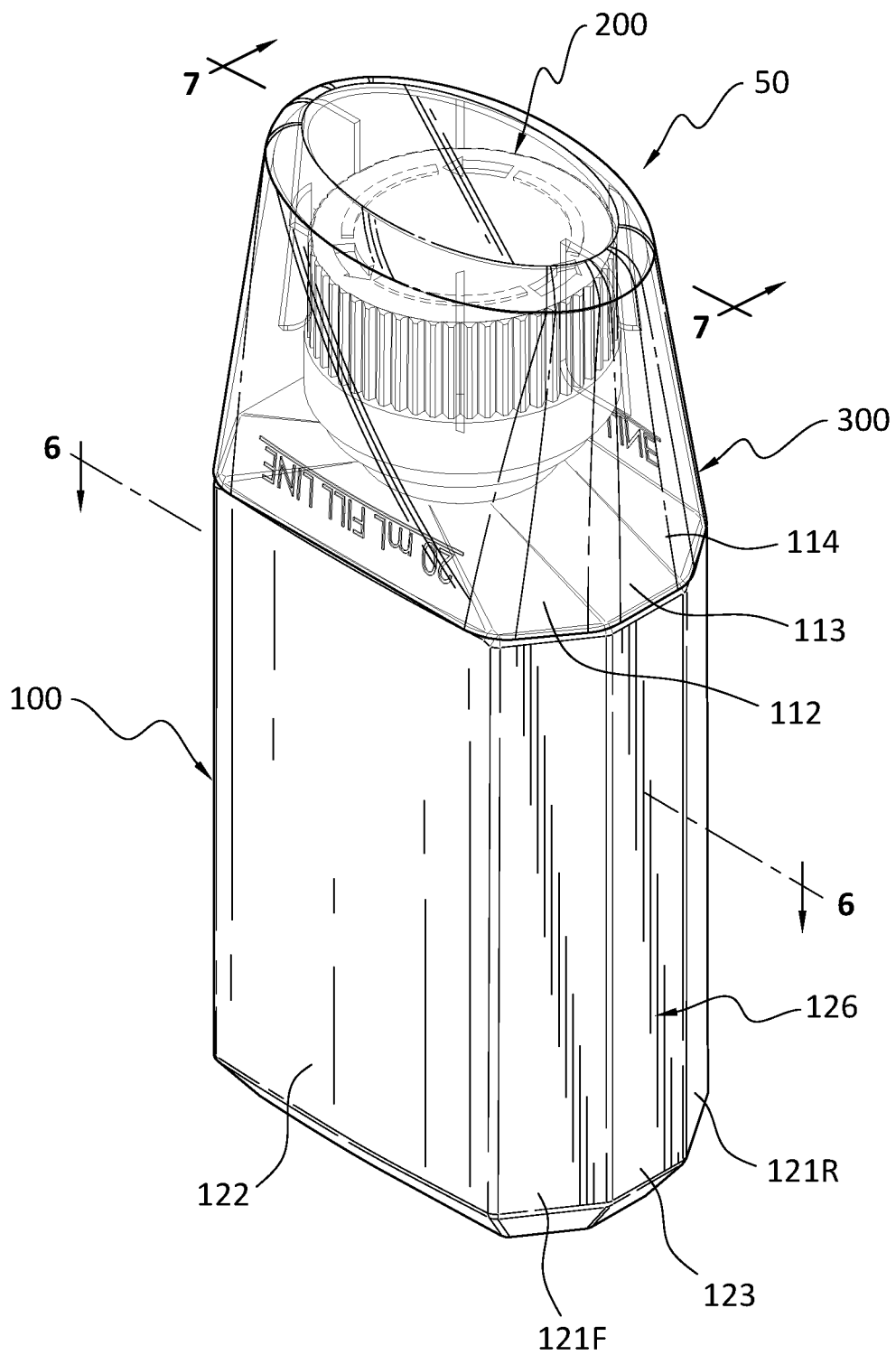
FIG. 1 is a perspective view showing the dispensing bottle of the present invention with the reusable dosage cup attached thereto.
Figure 1A:
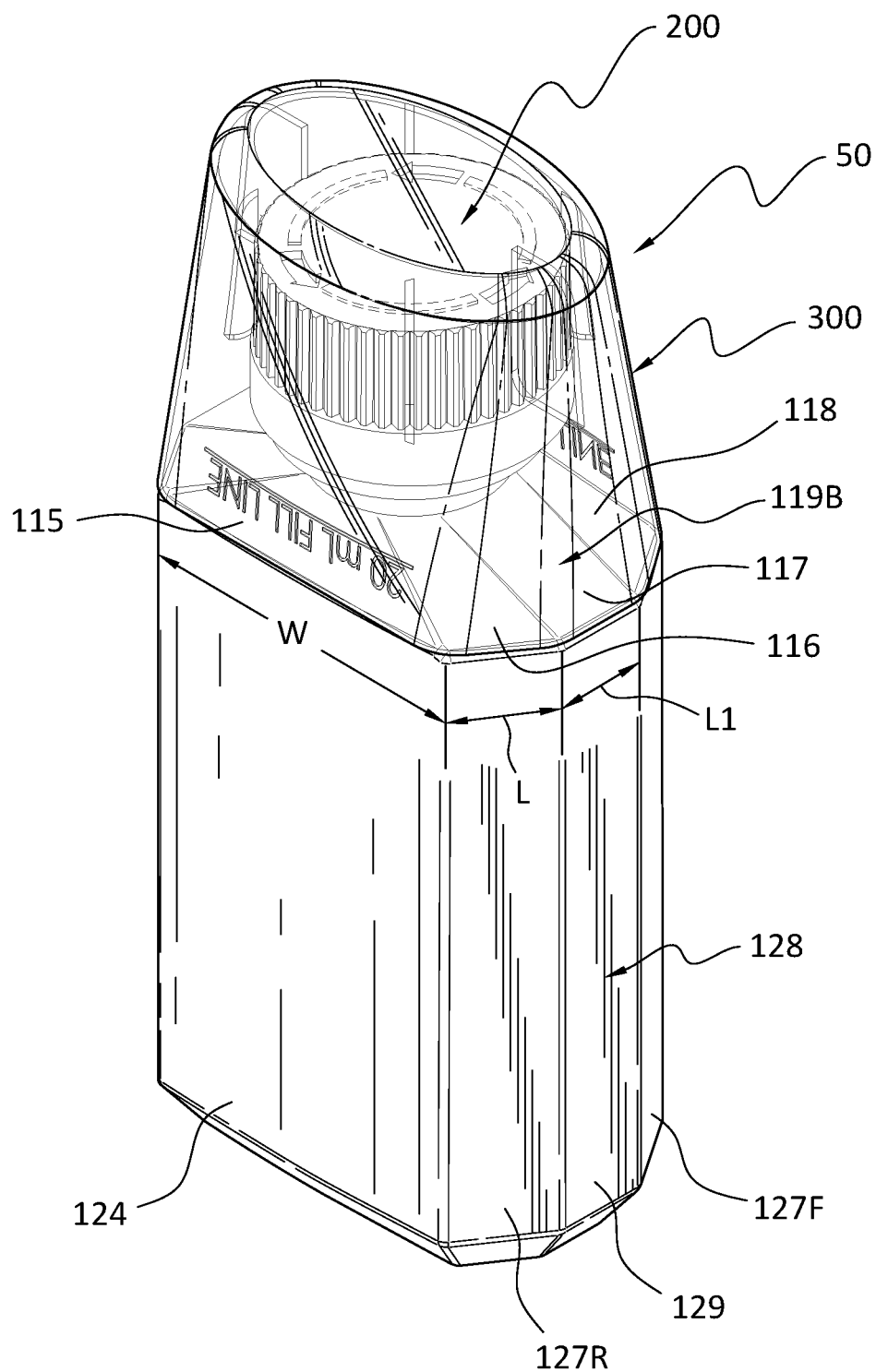
FIG. 1A shows the dispensing bottle of the present invention with the reusable dosage cup attached thereto rotated 180 degrees from that shown in FIG. 1.
Figure 2:
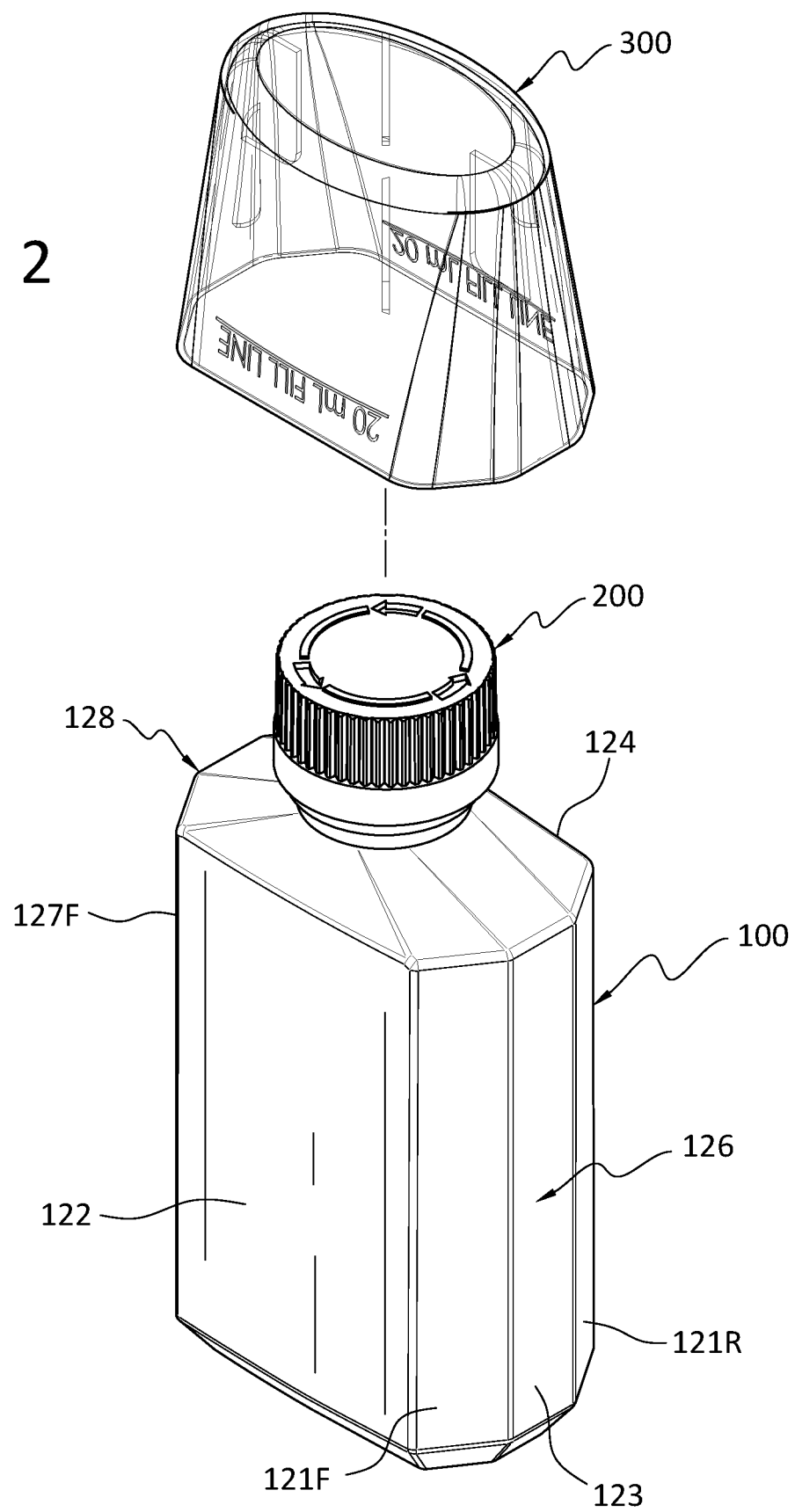
FIG. 2 shows the dispensing bottle of the present invention with the reusable dosage cup removed to expose the safety cap.

The multi-faceted bottle body 120 is symmetrical, which is evident by FIG. 1, FIG. 1A and the cross-sectional view shown in FIG. 6. FIG. 1A shows the same bottle 100 as that shown in FIG. 1 turned 180 degrees. The multi-faceted bottle body 120 includes a front wall 122, a rear wall 124, and a first side wall 126 and a second side wall 128 that extend between the front wall 122 and the rear wall 124. The first side wall 126 includes a front facet portion 121F, a central facet portion 123, and a rear facet portion 121R. The front facet portion 121F extends between the central facet portion 123 and the front wall 122 and the rear facet portion 121R extends between the central facet portion 123 and the rear wall 124. The front facet portion 121F and the rear facet portion 121R are angled relative to the central facet portion 123. That is, the central facet portion 123 lies in a vertical plane perpendicular to the spaced parallel vertical planes of the front wall 122 and the rear wall 124, while the front facet portion 121F lies in a vertical plane which is obliquely angled relative to the front wall 122 and the rear facet portion 121R lies in a vertical plane which is obliquely angled relative to the rear wall 124.

The second side wall 128 includes a front facet portion 127F, a central facet portion 129, and a rear facet portion 127R. The front facet portion 127F extends between the central facet portion 129 and the front wall 122 and the rear facet portion 127R extends between the central facet portion 129 and the rear wall 124. The front facet portion 127F and the rear facet portion 127R are obliquely angled relative to the central facet portion 129. That is, the central facet portion 129 lies in a vertical plane perpendicular to the spaced parallel vertical planes of the front wall 122 and the rear wall 124 while the front facet portion 127F lies in a vertical plane which is obliquely angled relative to the front wall 122 and the rear facet portion 127R lies in a vertical plane which is obliquely angled relative to the rear wall 124.

The base 130 is also faceted and extends from the front wall 122, the rear wall 124, the first side wall 126, and second side wall 128 down to a bottom 150 which can support the bottle 100 on a horizontal surface. The base 130 provides structure for supporting the bottom 150 of the bottle 100 such that the bottle 100 stands in an upright position when placed on a horizontal surface.

The multi-faceted shoulder 110 extends inward from the multi-faceted bottle body 120 and tapers on an angle upward toward the neck 107 which is circular. The neck 107 extends upward from the multi-faceted shoulder 110 to the finish 105 in an upward direction toward the mouth 102.

The multi-faceted shoulder 110 is an important feature of the bottle 100 as it aids in aligning the reusable dosage cup 300 during assembly of the packaging 50 and when one desires to attach the reusable dosage cup 300 back on the bottle 100 and the safety cap 200 after use.

The multi-faceted shoulder 110 includes eight facet portions which correspond with the front wall 122, the rear wall 124, the first side wall 126, and the second side wall 128 of the multi-faceted bottle body 120. Starting at the front wall 122 and working your way around the multi-faceted bottle body 120 counterclockwise in FIG. 3, a front shoulder facet portion 111 extends upwardly at an acute angle from the front wall 122 of the multi-faceted bottle body 120 and transitions into the neck 107, a first front side shoulder facet portion 112 extends upwardly at an acute angle from the front facet portion 121F of the first side wall 126 of the multi-faceted bottle body 120 and transitions into the neck 107, a first central shoulder facet portion 113 extends upwardly at an acute angle from the central facet portion 123 of the first side wall 126 of the multi-faceted bottle body 120 and transitions into the neck 107, a first rear shoulder facet portion 114 extends upwardly at an acute angle from the rear facet portion 121R of the first side wall 126 of the multi-faceted bottle body 120 and transitions into the neck 107, a rear shoulder facet portion 115 extends upwardly at an acute angle from the rear wall 124 and transitions into the neck 107, a second rear shoulder facet portion 116 extends upwardly at an acute angle from the rear facet portion 127R of the second side wall 128 of the multi-faceted bottle body 120 and transitions into the neck 107, a second central shoulder facet portion 117 extends upwardly at an acute angle from the central facet portion 125 of the second side wall 128 of the multi-faceted bottle body 120 and transitions into the neck 107, and lastly a second front shoulder facet portion 118 extends upwardly at an acute angle from the front facet portion 127F of the second side wall 128 of the multi-faceted bottle body 120 and transitions into the neck 107.

The upward angles of the first front side shoulder facet portion 112, the first central shoulder facet portion 113, and the first rear shoulder facet portion 114, which correspond with the first side wall 126 of the bottle 100 and form a first side facet shoulder 119A, vary such that they all meet at the neck 107. Similarly, the upward angles of the second rear shoulder facet portion 116, the second central shoulder facet portion 117, and the second front shoulder facet portion 118, which correspond with second side wall 128 of the bottle 100 and form a second side facet shoulder 119B, vary such that they all meet at the neck 107. The angles of the first front side shoulder facet portion 112 and the first rear shoulder facet portion 114 of the first side facet shoulder 119A extending up to the neck 107 are the same. Just as the angles of the second rear shoulder facet portion 116 and the second front shoulder facet portion 118 of the second side facet shoulder 119B extending up to the neck 107 are the same. Thus, the angles of facet portions 112, 114, 116, and 118 are all the same. The angle of the first central shoulder facet portion 113 extending up to the neck 107 is the same as the angle of the second central shoulder facet portion 117 extending up to the neck 107. The preferred angles are around 30 degrees, but other acute angles ranging from 30 to 60 degrees would function depending upon the shape of the reusable dosage cup 300 at its open end 320.

The front shoulder facet portion 111 extends upwardly at an acute angle from the front wall 122 and transitions into the neck 107 and the rear shoulder facet portion 115 extends upwardly at the same acute angle from rear wall 124 and transitions into the neck 107. The acute angle at which the front shoulder facet portion 111 and the rear shoulder facet portion 115 extend is greater than the angle of the first side faceted shoulder 119A and the second side faceted shoulder 119B. The preferred angle is less than 45 degrees, but other acute angles ranging from 30 to 60 degrees would function depending upon the shape of the reusable dosage cup 300 at its open end 320 as long as the angle from which the front shoulder facet portion 111 and the rear shoulder facet portion 115 extend is greater than the angle of the first side faceted shoulder 119A and the second side faceted shoulder 119B.

The safety cap 200 includes internal threads 37 which cooperate with the threads 104 on the finish 105. The safety cap 200 also includes a valve cover 31 which extends into and seals the dispensing valve 106 when the safety cap 200 is fastened to the threaded finish 105. The safety cap 200 also includes an external surface 24 in the form of a continuous circular side wall 202. The external surface 24 includes ribs 28 with grooves 26 therebetween about the circumference thereof. The ribs 28 permit the safety cap 200 to be securely gripped for removal by a user. The grooves 26 permit the reusable dosage cup 300 to be frictionally fit onto the safety cap 200 via the interaction of the fins 331-336 with the grooves 26 and ribs 28.

The safety cap 200 is disclosed in detail in copending U.S. patent application Ser. No. 18/322,333, which is incorporated herein by reference. Briefly, and referring to FIG. 6, the safety cap 200 includes an over cap 20 and a screw cap 30 secured within the over cap 20. The over cap 20 has a plurality of spaced downward lugs 23 extending downward from the top wall of the over cap 20 and the screw cap 30 has a plurality of spaced upward lugs 33 extending from the upper wall of the screw cap 30 which correspond with the downward lugs 23 in the over cap 20. Further, when the over cap 20 is sufficient depressed and turned, the downward lugs 23 engage the upward lugs 33 and the safety cap 200 can be removed from a threaded finish 105. If the over cap 20 is not sufficient depressed, the downward lugs 23 will slide over the upward lugs 33 and the safety cap 200 cannot be removed. This sliding of one lug over the other permits the safety cap 200 to rotate, when secured to the finish 105, in both a clockwise direction and a counterclockwise direction when the reusable dosage cup 300 is being secured to the safety cap 200 and bottle 100.

The reusable dosage cup 300 includes a closed end 310, an opposed open end 320 into which the liquid in the bottle 100 can be dispensed, and multi-faceted side walls integral with and extending from the closed end 310 to the open end 320. The multi-faceted side walls include a front wall 302 that is dimensioned at the open end 320 of the reusable dosage cup 300 to correspond with and match the dimension of the front wall 122 of the multi-faceted bottle body 120, a rear wall 304 that is dimensioned at the open end 320 of the reusable dosage cup 300 to correspond with and match the dimension of the rear wall 124 of the multi-faceted bottle body 120, a first side wall 306 having front facet portion 301 that is dimensioned at the open end 320 of the reusable dosage cup 300 to correspond with and match the dimension of the front facet portion 121F of the first side wall 126 of multi-faceted bottle body 120, a central facet portion 303A that is dimensioned at the open end 320 of the reusable dosage cup 300 to correspond with and match the dimension of the central facet portion 123 of the first side wall 126 of multi-faceted bottle body 120, a rear facet portion 305 that is dimensioned at the open end 320 of the reusable dosage cup 300 to correspond with and match the dimension of the rear facet portion 121R of first side wall 126 of multi-faceted bottle body 120, a second side wall 308 having front facet portion 307 that is dimensioned at the open end 320 of the reusable dosage cup 300 to correspond with and match the dimension of the front facet portion 127F of second side wall 128 of multi-faceted bottle body 120, a central facet portion 303B that is dimensioned at the open end 320 of the reusable dosage cup 300 to correspond with and match the dimension of the central facet portion 129 of the second side wall 128 of the multi-faceted bottle body 120, and a rear facet portion 309 that is dimensioned at the open end 320 of the reusable dosage cup 300 to correspond with and match the dimension of the rear facet portion 127R of the second side wall 128 of the multi-faceted bottle body 120.

The front wall 302 and rear wall 304 of the reusable dosage cup 300 have an indicator thereon, which in this case is a 20 ml FILL LINE. The interior surface 330 of the walls of the reusable dosage cup 300 includes a series of six spaced fins 331-336 that extend from the closed end 310 toward the open end 320. The six spaced fins 331-336 form a pattern which fit into the grooves 26 in the safety cap 200 to form a frictional fit therewith.

With the rear wall 304 of the reusable dosage cup 300 facing forward as shown in FIG. 5, the fin 331 is positioned at 1 o'clock, fin 332 is positioned at 3 o'clock, fin 333 is positioned at 5 o'clock, fin 334 is positioned at 7 o'clock, fin 335 is positioned at 9 o'clock, and fin 336 is positioned at 11 o'clock. While six spaced fins are shown, four or more could be used, but six spaced fins have been found to be optimal in securing the reusable dosage cup 300 to the safety cap 200. As can best be seen in FIGS. 2, 4, and 6 the ends of the fins 331-336 facing the open end 320 have rounded edges, allowing them to find their way into the grooves 26 on the safety cap 200 when placed onto the bottle 100.

The lengths of the front wall 122 of the multi-faceted bottle body 120, the rear wall 124 of the multi-faceted bottle body 120, the front wall 302 at the open end 320 of the reusable dosage cup 300, and the rear wall 304 at the open end 320 of the reusable dosage cup 300 are all the same length W when traveling around the circumference of the multi-faceted bottle body 120 and open end 320 of the reusable dosage cup 300.

The lengths of the front facet portion 121F of the first side wall 126, the rear facet portion 121R of the first side wall 126, the front facet portion 127F of the second side wall 128, the rear facet portion 127R of the second side wall 128, the front facet portion 301 at its open end 320, the rear facet portion 305 at its open end 320, front facet portion 307 at its open end 320, and the rear facet portion 309 at its open end 320 are all the same length L when traveling around the circumference of the multi-faceted bottle body 120 and open end 320 of the reusable dosage cup 300.

The lengths of the central facet portion 123 of the first side wall 126 of the multi-faceted bottle body 120, the central facet portion 303A of the reusable dosage cup 300 at its open end 320, and the central facet portion 303B of the reusable dosage cup 300 at its open end 320 are all the same length L1 when traveling around the circumference of the multi-faceted bottle body 120 and open end 320 of the reusable dosage cup 300.

Due to the multi-faceted bottle body walls, corresponding shoulder facets, and corresponding reusable cup side walls at its open end 320 all having matched lengths in addition to the matching angles of the shoulder facets, alignment of the side walls of the reusable dosage cup 300 with the front wall, rear wall, and side walls of the multi-faceted bottle body 120 results when the reusable dosage cup 300 is pressed downward to secure it to the bottle 100. The intersection of the multi-faceted shoulder 110, the multi-faceted bottle body 120, and the open end 320 of the reusable dosage cup 300 all have the same cross-sectional configuration and dimensions such that when the reusable dosage cup 300 is attached to the bottle 100 and aligned with the multi-faceted bottle body 120 the configuration of the multi-faceted bottle body 120 matches that of the circumferential configuration of the open end 320 of the reusable dosage cup 300.

Thus, the open end 320 of the reusable dosage cup 300 has a circumferential configuration which is dimensioned to be the same as the cross-sectional configuration of the multi-faceted bottle body 120, as shown in FIGS. 5 and 6. When the reusable dosage cup 300 is placed over the safety cap and pressed down to secure the reusable dosage cup 300 to the bottle 100, the reusable dosage cup 300 and safety cap 200 will rotate to a position such that the side walls of the reusable dosage cup 300 align with and match the cross-sectional configuration of the multi-faceted bottle body 120.

Now turning to FIGS. 9A-9C and FIGS. 10A-10C, attachment of the reusable dosage cup 300 to the safety cap 200 and bottle 100 will be described. Due to the multi-faceted and angled configuration of the multi-faceted shoulder 110 and the fact that the safety cap 200 as disclosed above is free to rotate until pressed down, alignment of the reusable dosage cup 300 with the multi-faceted bottle body 120 results. That is, the multi-faceted side walls of the reusable dosage cup 300 match and continue the configuration of the multi-faceted bottle body 120 during attachment of the reusable dosage cup 300 to the safety cap 200 and the bottle 100. This occurs during assembly at the factory and every time the reusable dosage cup 300 is reattached to the bottle 100 and safety cap 200 after use.

Figure 9C:
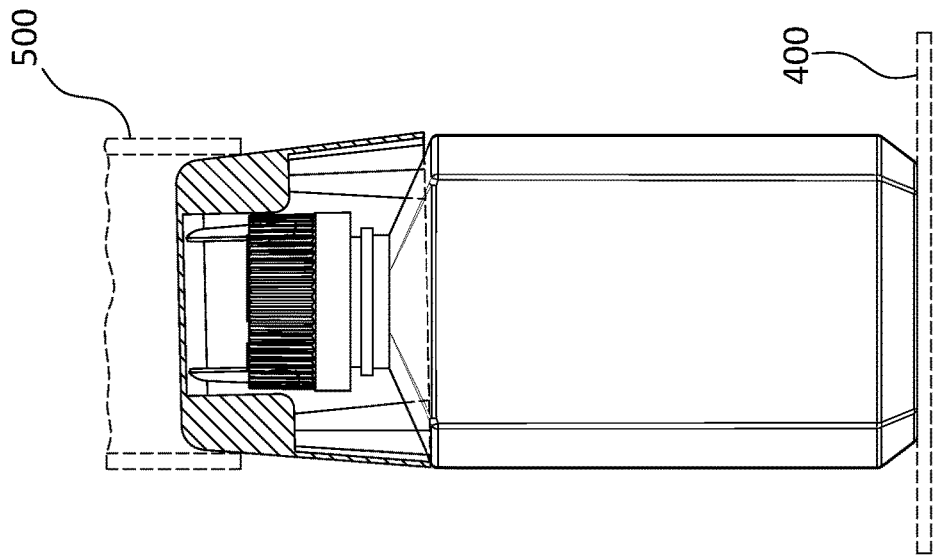
FIGS. 9A-9C are front elevation views showing the progression of the reusable dosage cup being secured to the safety cap and aligned with the multi-faceted bottle body.
Figure 9B:
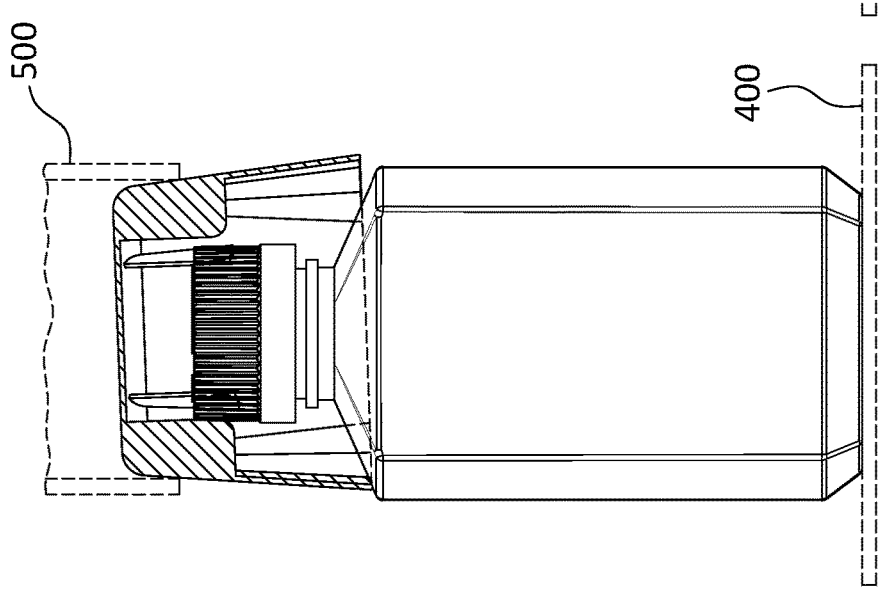
Figure 9A:
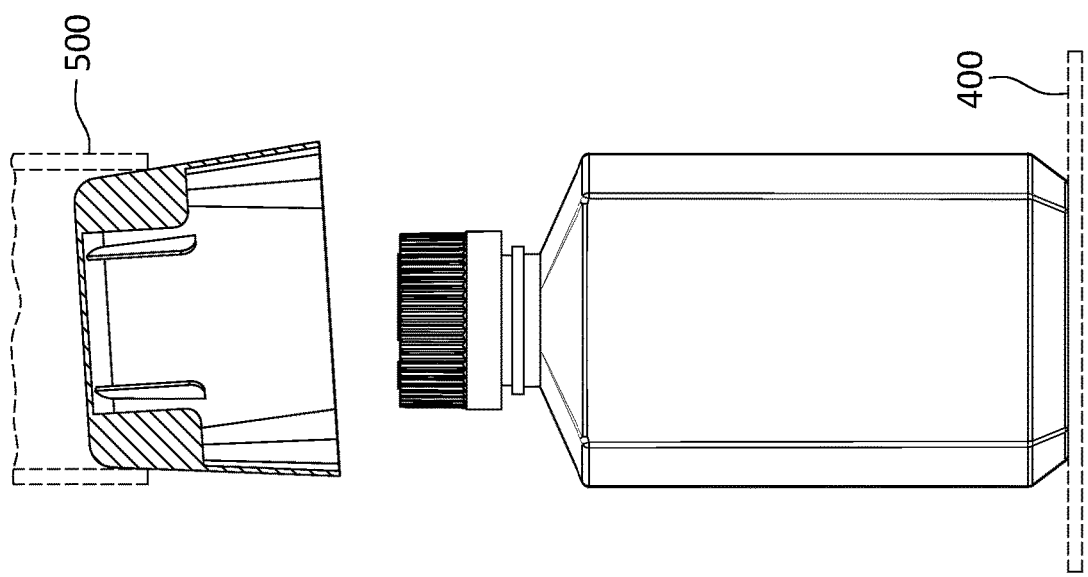

As seen in FIGS. 9A and 10A, as the bottle 100 travels along a conveyor surface 400 (shown in broken lines) the reusable dosage cup 300 is picked up by cup securer 500 (shown in broken lines) and, regardless of the orientation the reusable dosage cup 300 is picked up, attachment to the bottle 100 and the safety cap 200 always results in the multi-faceted configuration of the multi-faceted bottle body 120 matching the multi-faceted configuration of the reusable dosage cup 300 during assembly and every time the reusable dosage cup 300 is reattached after use. As shown, the reusable dosage cup 300 is picked up askew. However, as shown in FIGS. 9B and 10B, as the reusable dosage cup 300 is brought into contact with the safety cap 200 and the fins 331-336 slide into grooves 26 on the exterior of the safety cap 200, the multi-faceted shoulder 110 functions, due to the difference of the angles as discussed above, to turn the reusable dosage cup 300. The reusable dosage cup 300 is able to turn since the safety cap 200, onto which the reusable dosage cup 300 is being attached, is free to rotate. This turning causes the reusable dosage cup 300 to seat upon the multi-faceted bottle body 120 such that the configuration of the multi-faceted bottle body 120 and the reusable dosage cup 300 seated upon the bottle 100 matches due to the different angles of the multi-faceted shoulder forcing the reusable dosage cup 300 to rotate to match the configuration of the multi-faceted bottle body 120, as shown in FIGS. 9C and 10C.

Figure 8:
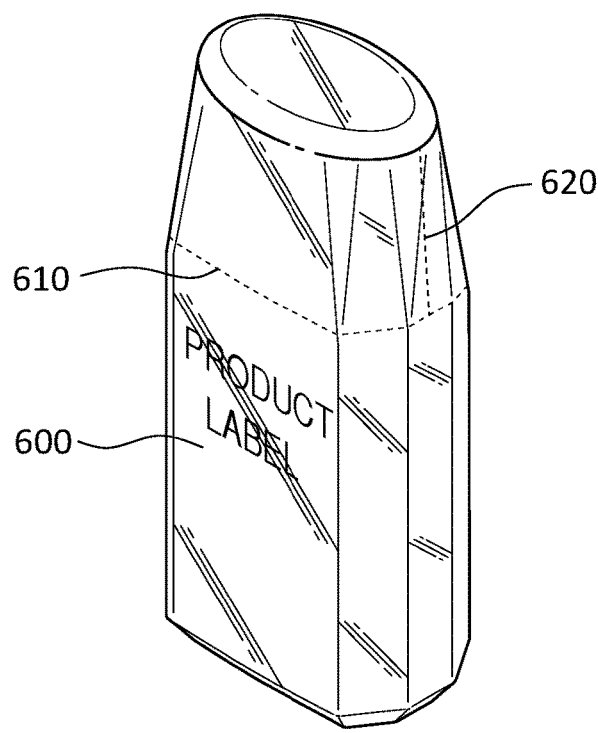
FIG. 8 shows the bottle and the reusable dosage cup assembled and wrapped with a graphic product label.

As shown in FIG. 8, once the reusable dosage cup 300 is secured to the bottle 100 via safety cap 200, the bottle 100 and reusable dosage cup 300 are wrapped with a product label 600 such that the reusable dosage cup 300 remains sanitary and unattachable from the bottle 100 until ready for use by a consumer. The product label includes perforations 610 at the intersection of the reusable dosage cup 300 and the multi-faceted bottle body 120 and perforations 620 on one of the side walls of the reusable dosage cup 300. These perforations, as shown in FIG. 11, allow the product label to be easily removed from the reusable dosage cup 300 so that it may be removed and access to the safety cap 200 permitted.

Use of the product and dispensing of the liquid mouthwash concentrate from the bottle 100 will be described with reference to FIGS. 11-16.

Figure 11:
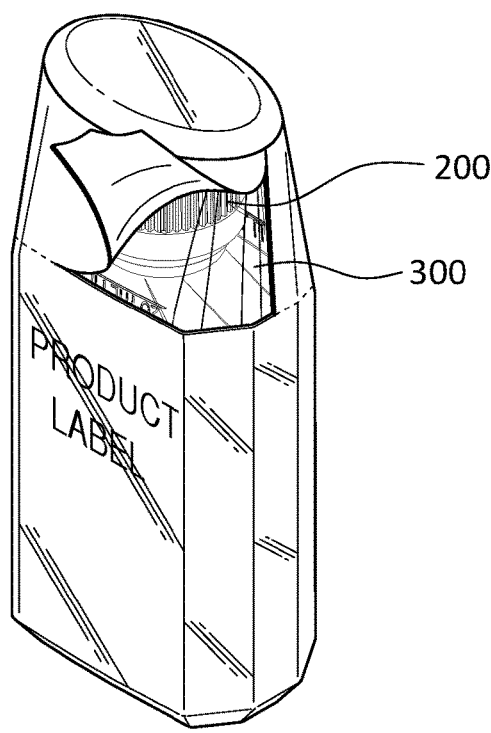
FIG. 11 shows the product label in FIG. 9 being removed to gain access to the reusable dosage cup.

As shown in FIG. 11, the product label 600 above the multi-faceted bottle body 120 is removed so that the reusable dosage cup 300 can be accessed and removed from the bottle 100. This permits access to the safety cap 200 allowing it to be removed to gain access to a liquid 800 in the bottle 100.

Figure 12:
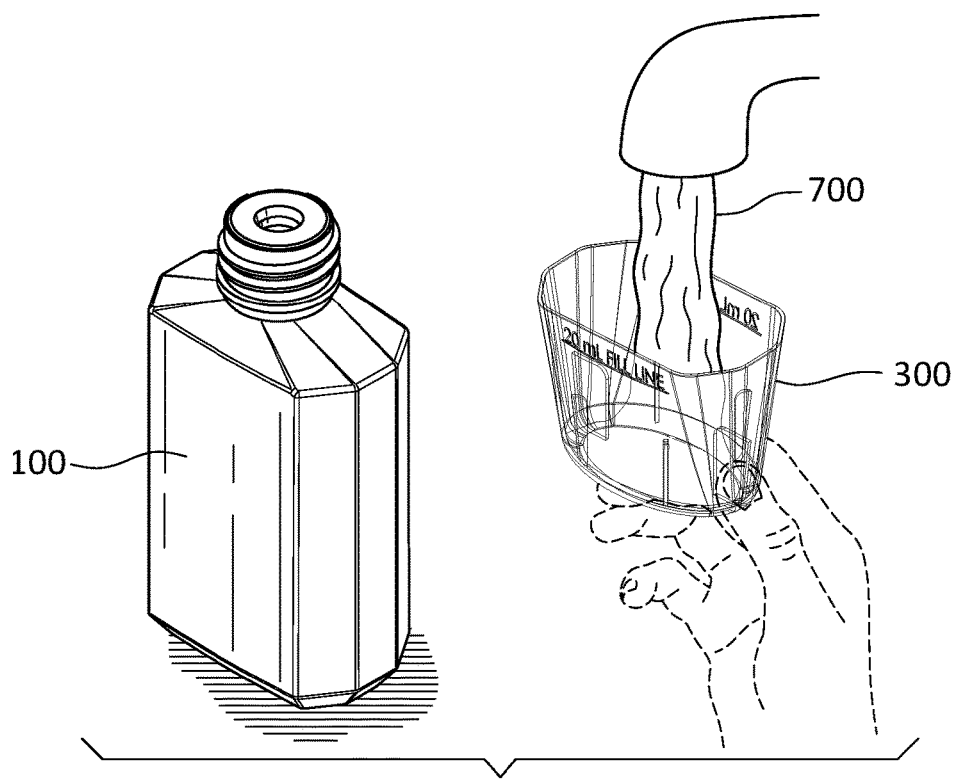
FIG. 12 shows the bottle with the safety cap removed to expose the dispensing valve and the reusable dosage cup being filled with tap water to the 20 ml FILL LINE.

As shown in FIG. 12, the reusable dosage cup 300 has been removed and turned over and the safety cap 200 has been removed from the bottle 100. The open end 320 is placed under a source of water and filled with water 700 up to the 20 ml FILL LINE.

Figure 13:
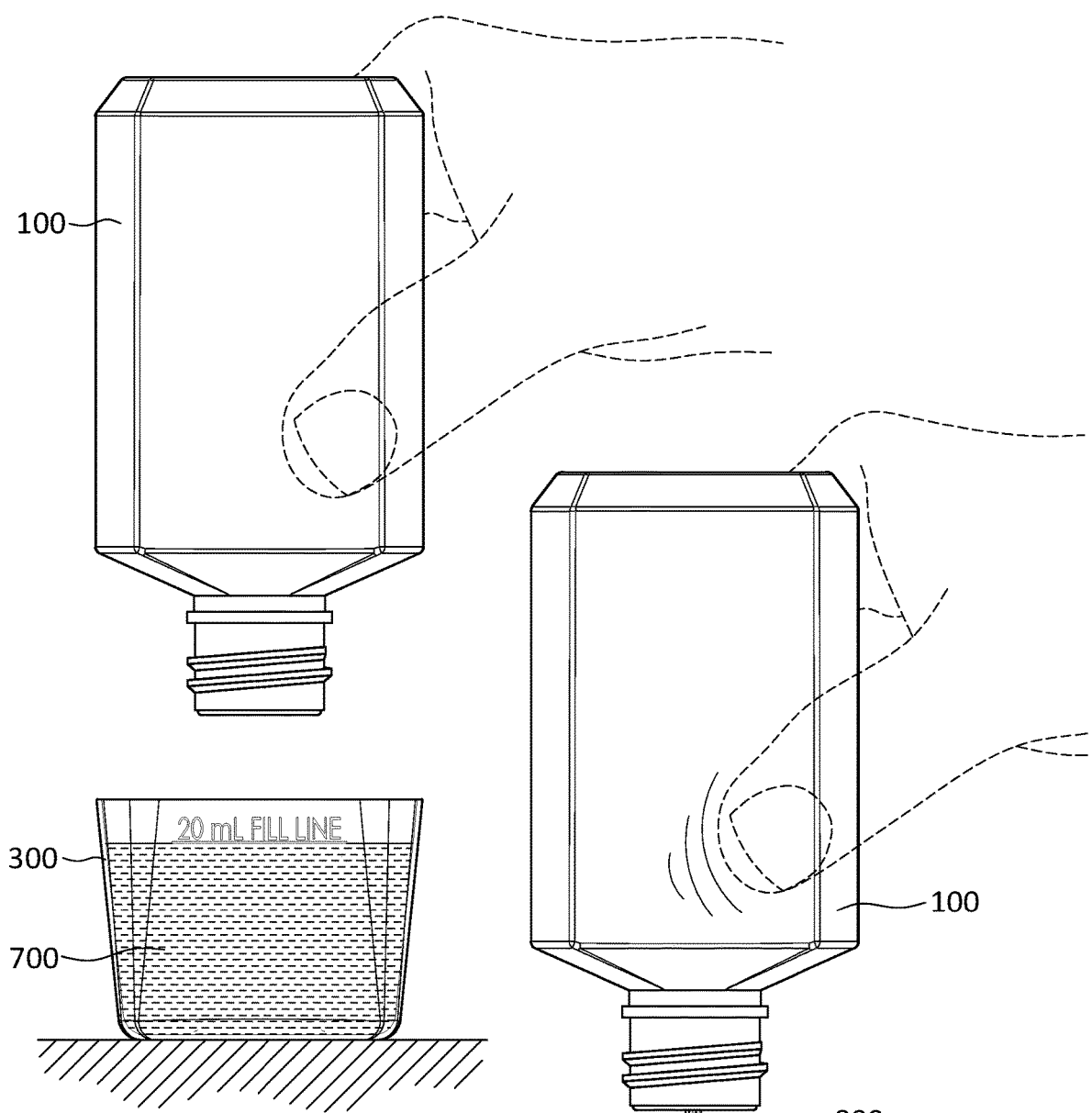
FIG. 13 shows the first step of dispensing a portion of the liquid contained in the bottle into the reusable dosage cup filled with water up to the 20 ml FILL LINE.
Figure 14:
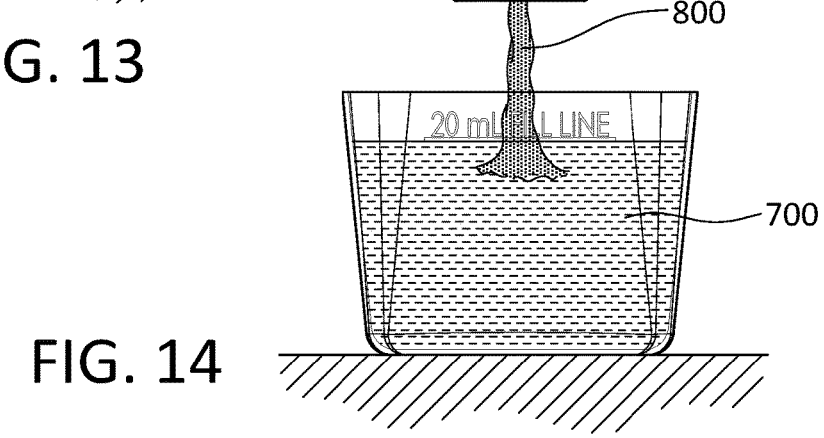
FIG. 14 shows the bottle being squeezed and the liquid beginning to flow into the reusable dosage cup filled with water up to the 20 ml FILL LINE.

Now turning to FIGS. 13 to 16, the bottle 100 is grasped and held over the reusable dosage cup 300 as shown in FIG. 13. The multi-faceted bottle body 120 is squeezed over the reusable dosage cup 300 and the liquid 800 contained within the bottle 100 is dispensed through dispensing valve 106 into the water 700 contained with the reusable dosage cup 300 as shown in FIG. 14. One squeeze generally dispenses 1 ml of liquid from the bottle 100. The bottle 100 contains 50 ml of mouthwash concentrate so it is good for 50 uses. Using one squirt from the 50 ml squeeze bottle 100 per 20 ml of water has been found to equal the number of uses generally obtained from a 1 L bottle of unconcentrated mouthwash. However, depending on a user's preference of strength of oral rinse, one or more squirts of the mouthwash concentrate 800 can be dispensed into the water. This is one of the benefits of the mouthwash concentrate 800, as the user can adjust the strength of the oral rinse by adding additional squirts. This feature is not available to those who use a conventional unconcentrated mouthwash. Another benefit of the 50 ml squeeze bottle versus the conventional 1 L bottle is shipping costs are much lower due to the size and weight of the mouthwash. Other benefits are that the mouthwash takes up less shelf space and is a convenient size to carry in a handbag or travel bag.

Figure 15:
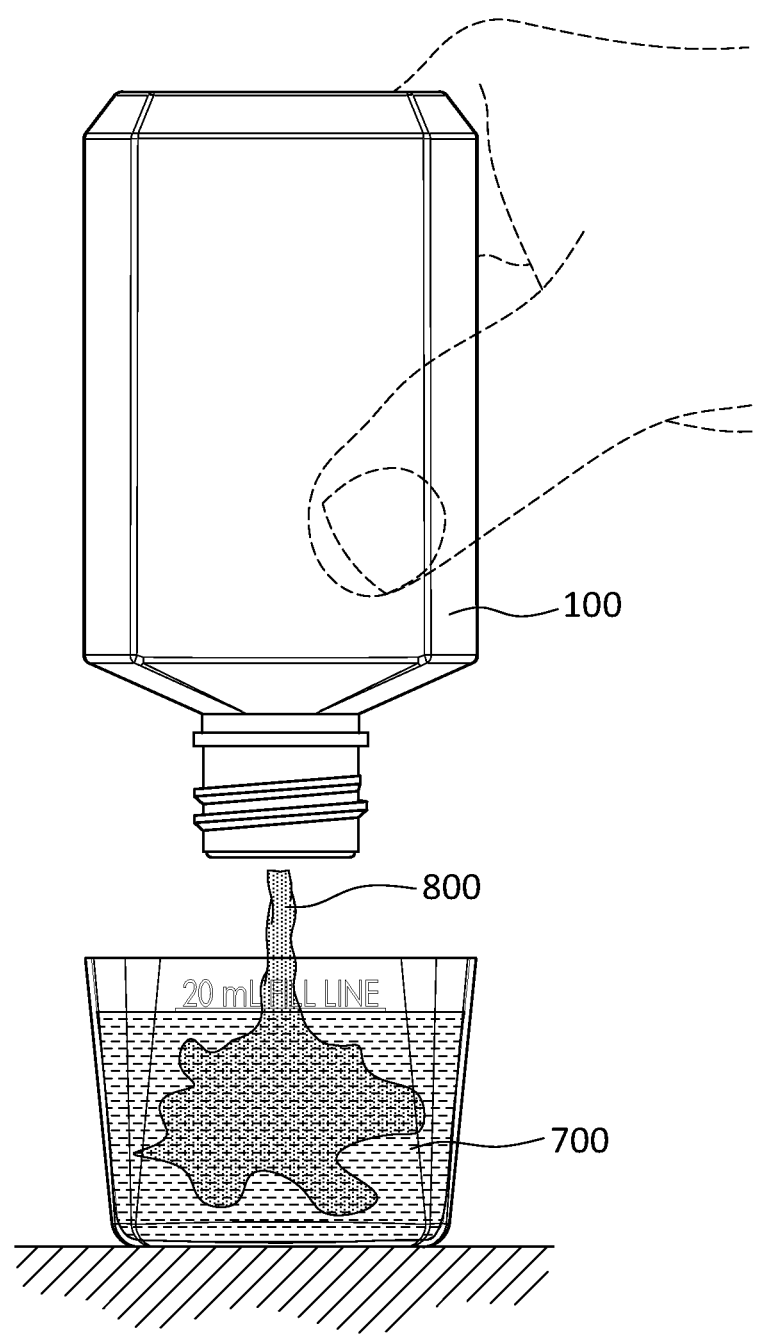
FIG. 15 shows the squeeze on the bottle being released, the liquid ending its flow from the dispensing valve, and the liquid self-mixing and dispersing into the water in the reusable dosage cup.
Figure 16:
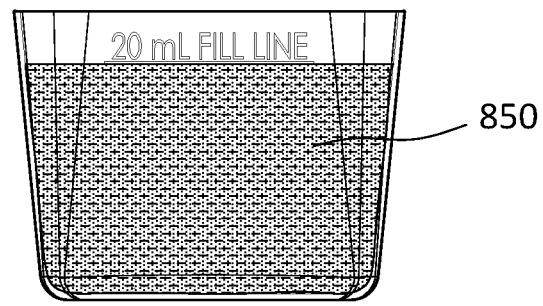
FIG. 16 shows the liquid in the reusable dosage cup being completely mixed within the water contained therein and the product ready for use.

As shown in FIG. 15, the squeeze on the bottle 100 has been released and the liquid 800 discontinues exiting the bottle 100. The liquid 800 mixes with the water 700. Due to the formulation of the mouthwash concentrate, the liquid 800 begins self-mixing and dispersing with the water 700 without any stirring or shaking and results in a complete mixing of the water 700 and liquid 800 to produce an oral rinse 850 as shown in FIG. 16.

While a preferred embodiment has been shown and described, it will be understood that there is no intent to limit the invention by such disclosure, but rather, is intended to cover all modifications and alternate constructions falling within the spirit and scope of the invention.

The invention claimed is:
1. A packaging for a liquid to be dispensed, comprising:
  a bottle having a mouth, a finish, a neck, a multi-faceted shoulder, a multi-faceted bottle body having a multi-faceted cross-sectional configuration, and a base;
  a safety cap which cooperates with the finish and is free to rotate when secured to the finish sealing the mouth of the bottle, the safety cap having a continuous side wall;
  a reusable dosage cup having a closed end and side walls that extend up to an open end, the side walls having an interior surface with a plurality of spaced fins extending inwardly to contact the continuous side wall of the safety cap and form a friction fit therewith such that the reusable dosage cup can be removably secured to the safety cap; and
  wherein the open end of the reusable dosage cup has a circumferential configuration dimensioned to be the same as cross-sectional dimensions and configuration of the multi-faceted bottle body and when the reusable dosage cup is placed over the safety cap and pressed down to secure the reusable dosage cup to the bottle, the reusable dosage cup and the safety cap will rotate to a position such that the side walls of the reusable dosage cup will align with and match the cross-sectional configuration of the multi-faceted bottle body.

2. The packaging fox a liquid to be dispensed of claim 1, further including a product label that wraps the multi-faceted bottle body and reusable dosage cup together.

3. The packaging for a liquid to be dispensed of claim 1, further including a dispensing valve in the mouth of the bottle.

4. The packaging for a liquid to be dispensed of claim 1, wherein the bottle contains a liquid is and the liquid is a mouthwash concentrate that is dispensed into the reusable dosage cup once filled with water.

5. The packaging for a liquid to be dispensed of claim 1, wherein the plurality of fins have a rounded edge.

6. The packaging for a liquid to be dispensed of claim 1, wherein the multi-faceted shoulder includes a front and a rear shoulder that angle up to the neck at the same angle and a first and a second side shoulder that angle up to the neck at the same angle and the angle of the front and rear shoulders is greater than the angle of the first and second side shoulders.

7. The packaging for a liquid to be dispensed of claim 1, wherein the continuous side wall of the safety cap includes a series of grooves and the fins of the reusable dosage cup fit into the grooves when the reusable cup is secured to the safety cap.

8. The packaging for a liquid to be dispensed of claim 1, wherein the safety cap can rotate both in a clockwise and a counterclockwise direction while secured to the finish in a position sealing the mouth and preventing removal without sufficient downward pressure.

9. The packaging for a liquid to be dispensed of claim 1, wherein the multi-faceted bottle body when traveling around the circumference of the multi-faceted bottle body includes a first side wall and an opposed second side wall between which a spaced front wall and a rear wall with matching lengths W extend, wherein the first side wall includes a first front facet portion of a length L, a first central facet portion of a length L1, and a first rear facet portion of a length L, and the second side wall includes a second front facet portion of a length L, a second central facet portion of a length L1, and a second rear facet portion of a length L.

10. The packaging for a liquid to be dispensed of claim 9, wherein the reusable dosage cup when traveling around the circumference of the open end of the reusable dosage cup includes multi-faceted side walls integral with closed end, the side walls include a front wall that is dimensioned at the open end of the reusable dosage cup to correspond with and match the length W of the front wall of the multi-faceted bottle body, a rear wall that is dimensioned at the open end of the reusable dosage cup to correspond with and match the length W of the rear wall of the multi-faceted bottle body, a first side wall having front facet portion that is dimensioned at the open end of the reusable dosage cup to correspond with and match the length L of the front facet portion of the first side wall of the multi-faceted bottle body, a central facet portion that is dimensioned at the open end of the reusable dosage cup to correspond with and match the length L1 of the central facet portion of the first side wall of the multi-faceted bottle body, a rear facet portion that is dimensioned at the open end of the reusable dosage cup to correspond with and match the length L of the rear facet portion of the first side wall of the multi-faceted bottle body, a second side wall having front facet portion that is dimensioned at the open end of the reusable dosage cup to correspond with and match the length L of the front facet portion of the second side wall of the multi-faceted bottle body, a central facet portion that is dimensioned at the open end of the reusable dosage cup to correspond with and match the length L1 of the central facet portion of the second side wall of the multi-faceted bottle body, and a rear facet portion that is dimensioned at the open end of the reusable dosage cup to correspond with and match the length L of the rear facet portion of the second side wall of the multi-faceted bottle body.

* * * * *